United States Patent [19]

Waghorn

[11] 4,356,626
[45] Nov. 2, 1982

[54] APPARATUS FOR AUTOMATICALLY INSERTING AN ELECTRICAL CONTACT INTO AN ELECTRICAL CONNECTOR

[75] Inventor: Robert D. Waghorn, Oneonta, N.Y.

[73] Assignee: The Bendix Corporation, Southfield, Mich.

[21] Appl. No.: 245,295

[22] Filed: Mar. 19, 1981

Related U.S. Application Data

[62] Division of Ser. No. 99,776, Dec. 3, 1979, Pat. No. 4,312,125.

[51] Int. Cl.³ ............................................ B23P 19/00
[52] U.S. Cl. ........................................................ 29/747
[58] Field of Search .................... 29/747, 821, 429; 221/211, 278

[56] References Cited

U.S. PATENT DOCUMENTS

| | | |
|---|---|---|
| 3,063,213 | 11/1962 | Goran . |
| 3,165,369 | 11/1965 | Maston . |
| 3,221,292 | 11/1965 | Swanson et al. . |
| 3,422,597 | 1/1969 | Beer . |
| 3,528,160 | 9/1970 | Wadleigh . |
| 3,725,844 | 4/1973 | McKeown et al. . |
| 3,757,995 | 9/1973 | Armstrong . |
| 4,082,398 | 4/1978 | Bourdon et al. . |
| 4,157,806 | 6/1979 | Bourdon et al. . |

FOREIGN PATENT DOCUMENTS 543690 11/1977 U.S.S.R. .

Primary Examiner—Francis S. Husar
Assistant Examiner—Carl J. Arbes
Attorney, Agent, or Firm—Charles D. Lacina

[57] ABSTRACT

An apparatus for automatically inserting electrical contacts into an electrical connector, the apparatus including a vibrating bowl (12, 112) which orients the contacts by vibrating and releases the oriented contacts one at a time to a contact loading position and guide device extending from the contact loading position to a contact unloading position adjacent the connector for guiding the contact in a forward direction to a cavity of the connector. The guide device includes a slide member (160) having a slide rod (162) slidably supported in a housing (142) for axially reciprocating each successive contact from the contact loading position to the contact loading position. At the contact loading position the contacts are propelled by an air pressure and guided to the unloading position adjacent the connector and into the connector. The connector is supported on a base member (64) of an X-Y table (32) to move in two directions so that the connector cavities are successively aligned to receive each contact propelled thereto.

16 Claims, 8 Drawing Figures

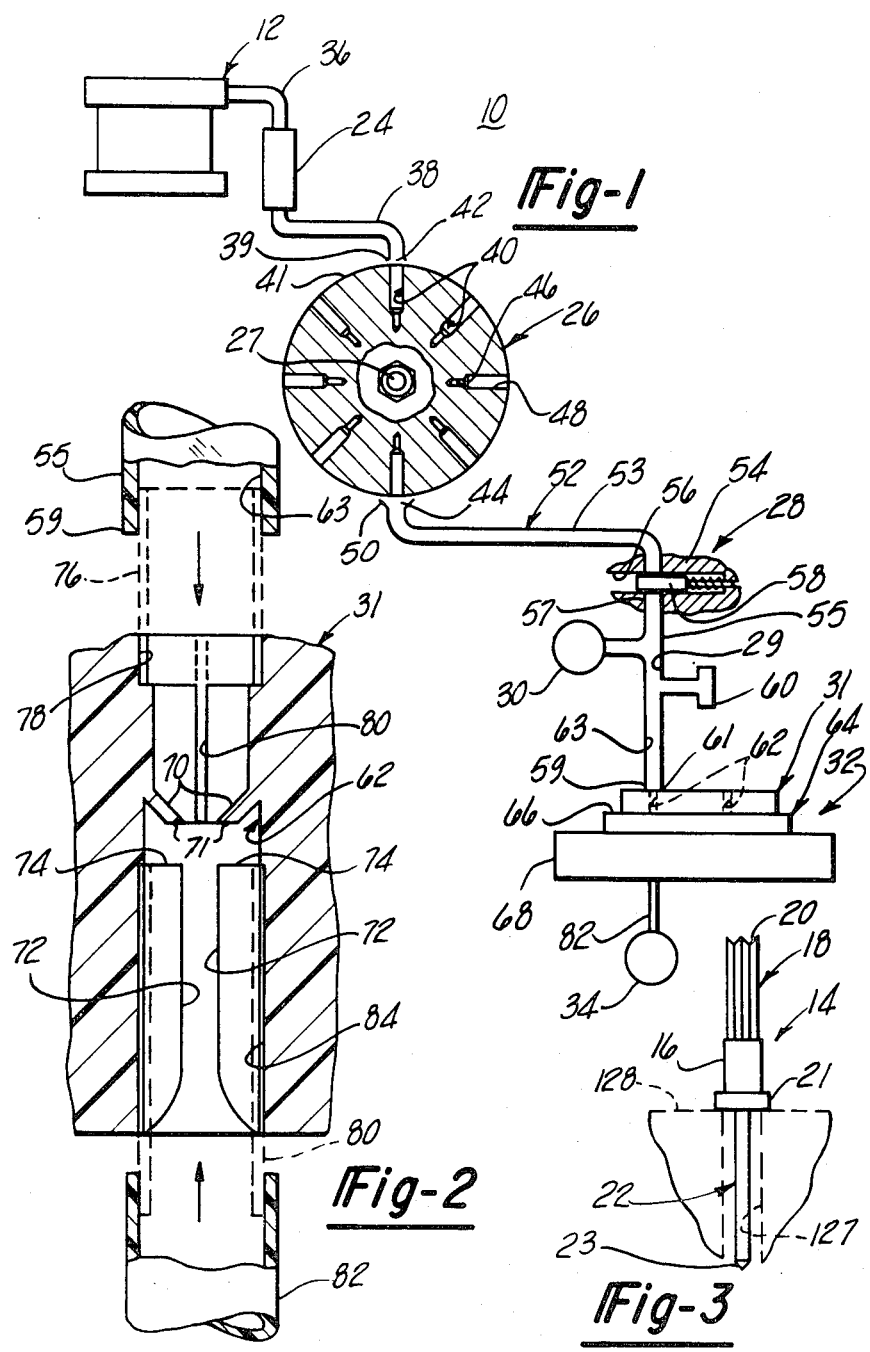

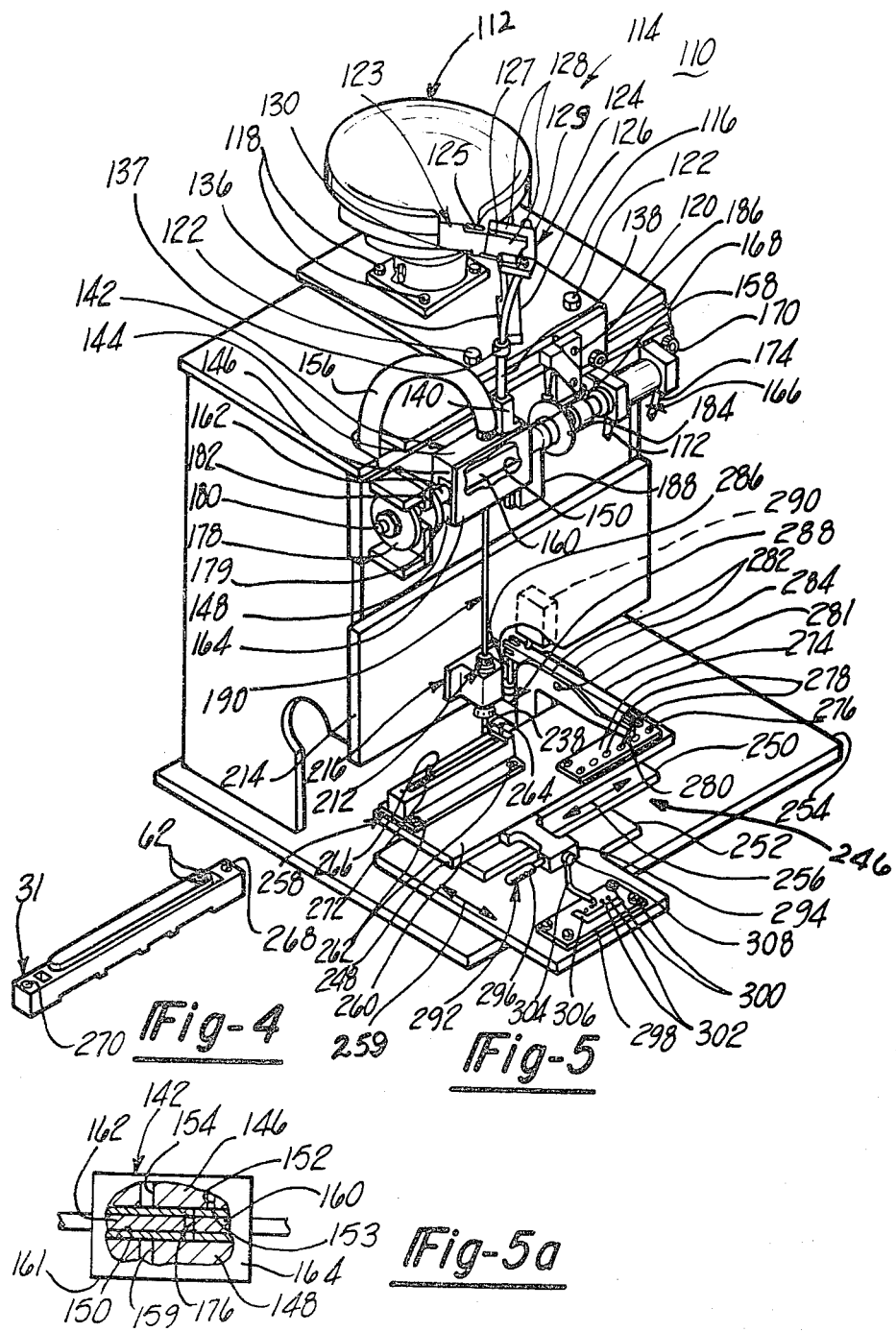

ial contacts into connectors was to insert such electrical contacts manually as shown in FIGS. 6 through 8 of the U.S. Pat. No. 4,082,398. In another known system the electrical contacts are loaded into a transfer block unit which in turn may be used to position the electrical contacts above the cavities formed in the connector after which the electrical contacts are individually inserted by hand. Oftentimes such manually inserted electrical contacts do not obtain a positive seat in their respective retention systems within the connector. Because such insertion is done manually, the time required to assemble a completed connector assembly is great and therefore, the assembly operation is costly.

APPARATUS FOR AUTOMATICALLY INSERTING AN ELECTRICAL CONTACT INTO AN ELECTRICAL CONNECTOR

This is a division, of application Ser. No. 99,776, filed Dec. 3, 1979 and now U.S. Pat. No. 4,312,125 issued Jan. 26, 1982.

TECHNICAL FIELD

This invention relates to method and apparatus for inserting an electrical contact into an electrical connector and, in particular, to method and apparatus for automatically inserting electrical contacts into an electrical inserting electrical contacts into an electrical connector.

CROSS-REFERENCE TO RELATED APPLICATION

The present invention is related to concurrently filed patent application (Ser. No. 105,695 now abandoned) by H. Uhlig entitled "Improved Apparatus for Automatically Inserting an Electrical Contact in an Electrical Connector and Method of Making an Electrical Connector Assembly" the entire disclosure of which is incorporated herein by reference.

BACKGROUND ART

Electrical connectors are utilized in electrical instrumentation to connect together the multiplicity of wires carrying electrical power and signals within and between different electrical instruments making up the system or systems. For example, in the aerospace field, as electronic systems become more and more complex, the systems are miniaturized to minimize their weight and size. Hence the electrical connectors interconnecting the systems must also be reduced in size. In some instances electrical connectors may carry hundreds of electrical contacts to interconnect hundreds of wires. Each of the contacts and wires associated with such a connector is quite small (about ½ inch long with a diameter of about 0.029 inches).

Some connectors provide for rear insertion and release of electrical contacts while others provide for front insertion and release of electrical contacts. Examples of a prior art electrical connector having insertable and removable contacts may be found in U.S. Pat. No. 3,165,369 entitled "Retention System for Electrical Contacts" issued Jan. 12, 1966 to J. W. Maston; and U.S. Pat. No. 3,221,292 entitled "Electrical Connector" and issued Nov. 30, 1965 to G. J. Swanson et al.

For many years connector manufacturers have been improving and developing means to retain electrical contacts in the electrical connector so that they may be easily inserted and removed with little or no dislocation of the contacts on insertion, removal and mating. For example, the U.S. Pat. No. of Bourdon et al 4,082,398 issued Apr. 4, 1978 and Bourdon et al 4,157,806 issued June 12, 1979, the entire disclosures of which are incorporated herein by reference, disclose electrical inserts for retaining a plurality of electrical contacts in an electrical connector having a plurality of radially deflectable contact-retaining fingers.

While there have been many efforts to improve and develop means to retain electrical contacts in the electrical connector, little effort has been exerted to discover ways for more efficiently and economically inserting the electrical contacts into the electrical connector. The only known prior method of inserting electri-

DISCLOSURE OF THE INVENTION

An object of the present invention is to provide an apparatus for automatically inserting an electrical contact of the type having a retention portion into an electrical connector.

Another object of the invention is to provide an apparatus which reduces the cost and time associated with the assembly of electrical contacts in an electrical connector.

A further object of the invention is to provide an apparatus for insuring that an inserted electrical contact is positively seated within an electrical connector.

It is also an object of this invention to provide a method of inserting an electrical contact into an electrical connector in an efficient and relatively inexpensive fashion.

It is also another object of the invention to provide a method of automatically inserting an electrical contact into an electrical connector.

It is still a further object of the invention to provide a method of inserting an electrical contact into an electrical connector by the use of a regulated air pressure source.

In carrying out the above objects and other objects of this invention a preferred embodiment of the invention includes an apparatus (10, 110) for automatically inserting an electrical contact (14) of the type having a retention portion (21) into an electrical connector (31) which is adapted to retain the contact in the cavity of the connector by a contact retention mechanism (70, 72). The apparatus includes guide means (55, 76, 194, 190, 236) extending from a contact loading position to a contact unloading position adjacent the connector for guiding the contact in a forward direction from the loading position to the cavity (62) of the connector. The apparatus also includes propelling means (30) operatively associated with the guide means for controllably propelling the contact, the guide means guiding the propelled contact into the cavity.

A preferred method of inserting an electrical contact into an electrical connector includes the steps of positioning the contact at a contact loading position; propelling the contact; and guiding the contact along a predetermined path from the contact loading position to a contact unloading position aligned with a cavity of the connector.

The objects, features and advantages of the present invention are readily apparent from the following detailed description of the best mode taken in connection with the accompanying drawings.

BRIEF DESCRIPTION OF THE DRAWINGS

FIG. 1 is a schematic sectional view, partially broken away, of a first embodiment of the present invention;

FIG. 2 is a slightly enlarged, sectional view partially broken away of the first embodiment of the present invention;

FIG. 3 is a side elevational view of an electrical contact used in the apparatus of the first and second embodiments of the present invention;

FIG. 4 is a perspective view of a connector used with the apparatus of the first and second embodiments of the present invention;

FIG. 5 is a perspective view, partially broken away, of the second embodiment of the invention;

FIG. 5a is a sectional view of the second embodiment of the invention;

BEST MODE FOR CARRYING OUT THE INVENTION

Figure 6:
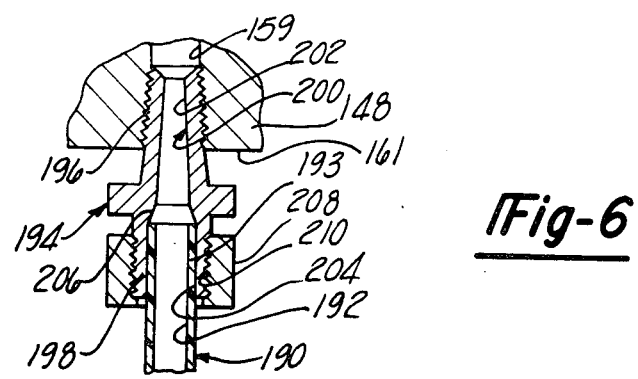
FIG. 6 is a sectional view partially broken away of the second embodiment of the present invention.

With reference to the drawings, a first embodiment of an apparatus for automatically inserting electrical contacts into an electrical connector is collectively designated by reference numeral 10 in FIG. 1. The apparatus 10 includes a vibrating bowl 12 adapted to receive a plurality of electrical contacts of the type exemplified by the contact generally indicated at 14 in FIG. 3. The contacts are also generally of the type disclosed in U.S. Pat. No. to McKeown et al 3,725,844 entitled "Hemaphroditic Electrical Contact", the entire disclosure of which is incorporated herein by reference. More specifically, the contact 14 includes a holder portion 16 for holding a bundle of fine brush wires 18 having angled end surfaces 20. The contact 14 also includes an enlarged retention portion or shoulder 21 which is received and retained within a connector as is described in greater detail below. The contact 14 further includes a tail portion 22 having a tapered end surface 23. In the first embodiment it is assumed that the tail portions of the contacts are heavier than the holder portions of the contacts.

In general, the bowl 12 vibrates the contacts received therein and causes them to move upwardly so that the contacts are aligned or oriented as they exit the bowl 12, holder portion first. An inspecting device 24 inspects the oriented contact to determine whether a particular contact should be accepted or rejected. The apparatus 10 further includes a rotary indexer 26 which receives the inspected contacts, rotates about its axis 27, and releases the contacts oriented so that the tail portions are first. A slide unit 28 allows the contacts one at a time into an air chamber 29 in a transfer tube 55. A first regulated air pressure source 30 produces a forward air pressure force in the air chamber 29 behind a positioned contact 14 at its holder portion 16 to thereby propel the contact 14 through the tube 55 and into a cavity 62 in a connector 31 which is supported on a conventional X-Y indexing table 32.

The apparatus 10 also includes a second regulated air pressure source 34 for producing a reverse air pressure force in the cavity to seat the retention portion 21 of the contact 14 within the connector 31.

Considering the apparatus 10 in greater detail, the vibrating bowl 12 preferably comprises a conventional motorized vibrating unit or bowl sold by Hanson Systems Incorporated of North Attleboro, Massachusetts which vibrates the contacts which are positioned therein so that the contacts move upwardly on a grooved upwardly sloping surface the contacts being held within the groove which extends upwardly on the sloping surface. The tail portions of the contacts are heavier than the holder portions of the contacts, so that the contacts exit the bowl 12 one at a time, holder portions first.

The contacts are then received in a transfer tube 36 which conveys the contacts by air pressure or other means such as by gravity into the inspecting device 24 which may include therein a conventional optoelectronic circuit for generating a signal which would indicate whether a particular contact is to be accepted or rejected. For example, a particular contact could be rejected if its tail portion entered the inspecting device 24 before its holder portion or if the tail portion of a particular contact was too short or bent or even if the wires of the contact were bent or splayed.

After exiting the inspecting device 24, holder portions first, the contacts enter a second transfer tube 38 under the influence of gravity or air pressure and exit the tube 38 through a flared opening 39 to a contact receiving station 42 at the indexer 26. Each of the contacts enter one of the contact receiving passages 40 formed in indexer 26 through its outer circumferential surface 41 which are adapted to receive a contact at the receiving station 42 and release the contacts at a releasing station 44. Each of the contact receiving passages 40 includes a holder receiving portion 46 and a tail receiving portion 48 for receiving the holder and tail portions of the contacts such as holder and tail portions 16 and 22, respectively, of the contact 14.

At the releasing station 44 the contacts enter a flared opening 50 of the upper part 53 of a third transfer tube 52 which extends from the releasing station 44, to the slide unit 28 and to the connector 31. The third transfer tube 52 extends into and is held within a cylinder 54 of the slide unit 28 having a bore 56 extending transversely to the tube 52 to interrupt movement of contacts through the third transfer tube 52. A solenoid operated piston 58 is slidably disposed within the bore 56 to alternately and controllably establish and interrupt fluid communication between the upper part 53 of the third transfer tube 52 and a lower part 55 of the third transfer tube 52. The lower part 55 of the tube 52 has first and second ends 57 and 59, respectively, and a passage 63 extending therethrough between the first and second ends 57 and 59, respectively.

When the piston 58 is retracted a single contact is allowed to enter the air chamber 29. A holder illustrated at 60, which comprises an air trap, temporarily holds the contact within the air chamber 29 until the piston 58 is extended over the lower part 55 of the third transfer tube 52 to thereby seal the lower part 55. The first air pressure source 30 is activated by the extension of the piston 58 within the bore 56 to thereby induce or shoot air into the lower part 55 of the third transfer tube 52 at the holder part of the contact to thereby propel the contact into one of the cavities 62 formed in the connector 31 so the contact enters the cavity with its tail portion first.

Each of the transfer tubes 36, 38 and 52 preferably comprises a semi-rigid clear plastic tubing which may comprise shrink polyoleofin.

The X-Y table 32 includes a top base member 64 which supports the connector 31 at its top surface 66. The X-Y table also includes a lower base member 68 which supports the top base member 64 to move there-over. The upper base member 64 moves conventionally in a plane perpendicular to the tube 52 at an unloading position 61 relative to lower base member 68 of the X-Y table 32 to thereby move the connector 31.

The top base member 64 of the X-Y table 32 is manually movable so that the cavities of the connector 31 are successively aligned with the second end 59 of the lower part 55 of the third transfer tube 52 at the unloading position 61. Alternatively, the X-Y table 32 could be moved in an automatic fashion such as by conventional tape programming.

Each of the propelled contacts such as the contact 14 is retained within its respective cavity 62 by a contact retention mechanism. For example, in the specific embodiment of the invention shown in FIGS. 1 and 2, the contact retention mechanism includes a contact retention cone comprising retention fingers 70 integral with the connector 31 and a plurality of axially extending ribs 72, also integral with the connector 31. The fingers 70 are located coaxially within each cavity 62 and taper radially inwardly to forward free ends 71 which terminate a predetermined distance from the rearwardly facing shoulder 74 on each of the ribs 72. The fingers 70 are resiliently radially expandable to allow movement of the retention portion of the contact therepast.

Examples of similar contact retention mechanisms of electrical connectors are shown in the previously mentioned U.S. Pat. No. of Bourdon et al 4,157,806. As shown in the Bourdon et al 4,157,806 patent, such contact retention mechanisms are formed by using core pins and core bushings to form mold cavities in which thermoplastic material in liquid form is poured and allowed to harden.

As shown in FIG. 2 by phantom lines, an alignment tool 76 is press fit into the second end 59 of the lower part 55 of the third transfer tube 52 to guide the contacts into their cavities 62 so that the shoulder portion of each contact is disposed between the ends 71 of the fingers 70 and the shoulders 74. The alignment tool 76 is made from the particular molding core pin used in forming the fingers 70 in the cavity 62. The tool 76 is made by forming an axial bore through the core pin to allow passage of a propelled contact therethrough and etching the core pin with acid on its outer surface so that the alignment tool 76 fits within a chamfered portion 78 of the cavity 62. The alignment tool 76 reduces the reverse flow of air pressure from the cavity 62 and back into the lower part 55 of the third transfer tube 52 by filling the slots between the fingers 70 such as slot 80.

The apparatus 10 also includes a seating tool indicated in phantom at 80 connected in fluid communication with the second air pressure source 34 by tubing 82. The seating tool 80 allows the second air pressure source 34 to induce an air pressure force between the fingers 70 and the shoulders 74 of the connector 31 to seat the shoulder portions of the contacts therebetween. If the contact is not seated within the contact retention mechanism due to excessive icicle flash, a bent tail portion of the contact, bent wire brush, or insufficient air pressure in the air chamber 29, the contact will be expelled from the cavity 62 through the chamfered portion 78 of the cavity 62.

Like the alignment tool 76, the seating tool 80 is made from the particular molding core bushing of the molding apparatus which made the ribs 72. The tool 76 is made by etching the outer surface of the core bushing with acid to fit within a lower portion 84 of the cavity 62 and by forming an axial bore through the core bushing to allow air to flow therethrough.

The apparatus 10 operates by first vibrating the contacts within the vibrating bowl 12 to align and orient the contacts. The aligned contacts are then received within an inspecting device 24 which will generate a signal to indicate whether a particular contact is positioned improperly or is defective. The inspected contacts are then received with their holder portions inserted first within the rotary indexer 26 which in turn moves the contacts to the releasing station 44 and releases them, tail portions first. The slide unit 28 then operates to allow one contact at a time into the air chamber 29 by retracting and extending to seal the lower part 55 of the third transfer tube 52. The first air pressure source 30 then shoots air into the air chamber 29 at the holder portion of the contact to propel the contact into an aligned cavity 62 formed in the connector 31. The contact is then either seated within the contact retention mechanism or expelled from the connector 31 by applying a reverse air pressure within the cavity 62. Thereafter, the X-Y table 32 on which the connector 31 is mounted is moved so that a second cavity of the connector 31 is aligned with the second end 59 of the lower part 55 of the third transfer tube 52 so that a second contact can be propelled and received therein.

With reference to the drawings, a second and preferred embodiment of an apparatus for automatically inserting electrical contacts into an electrical connector is collectively designated by the reference numeral 110 in FIG. 5.

As in the first embodiment, oriented contacts are positioned at a contact loading position adjacent the first end of tubing and are propelled by an air pressure source so that the contacts move within the tubing. The tubing guides the contacts one at a time from a position adjacent the contact loading position to a position adjacent the contact unloading position and into a connector exemplified by the connector 31 shown in FIG. 4.

The contacts to be loaded within the connector 31 as exemplified in FIG. 4, have tail portions which are heavier than their holder portions. The vibrating bowl 112 is substantially the same as the vibrating bowl 12 of the first embodiment and vibrates the contacts until the contacts exit the bowl 112 with their tail portions first.

The apparatus 110 includes a support structure generally indicated at 114 for supporting the other various components of the apparatus 110. The bowl 112 is mounted on a support plate 116 by bolts 118. In turn, the support plate 116 is mounted to a horizontal frame member 120 of the support structure 114 by bolts 122.

The contacts exit the bowl 112 at a support member 123 secured thereto to vibrate therewith and which has a groove 125 formed in its upper surface to receive the contacts therein. The groove 125 is aligned with a tapered slot 127 formed between projecting arms 128 of an air cylinder housing 129 of an air cylinder 124. The air cylinder 124 includes a slide rod 130 having a contact receiving passage formed therein for moving a contact positioned therein.

The contacts which exit from the grooved support member 123 fall between the downwardly sloping arms 128 of the housing 129 and are caught therebetween at the lower surface of the shoulders or retention portions of the contacts so that the relatively heavy tail portions of the contacts extend into the slot 127, the contacts being substantially vertical as shown in phantom in FIG. 3. As more and more contacts are positioned on and between the arms 128, the forwardmost contact falls between the arms 128 at its widest position and into the passage formed in the slide rod 130.

The air cylinder 124 is supported on the support plate 116 by a vertical support member 126. The slide rod 130 of the air cylinder 124 moves the contacts one at a time in a controlled fashion to a position immediately above a first transfer tube 136 to fall therein and into a pressurized venturi tube 138, the tail portion of the contact being the first part of the contact to enter the transfer tube 136. The contact is oriented tail portion down in both transfer and venturi tubes 136 and 138, respectively.

The contact is sucked or pulled into the venturi tube 138, through a block 140 which supports one end of the tube 138, and into a housing generally indicated at 142 which supports the block 140 at its top surface 144. The transfer tube 136 and the venturi tube 138 are coupled together by a fitting 137.

The housing 142 generally comprises a U-shaped structure having integrally formed upper arm and lower arm members 146 and 148 which define a housing cavity 150 therebetween. The upper arm member 146 includes a pair of spaced first and second passages 152 and 154 extending therethrough between the top surface 144 and the housing cavity 150. The first passage 152 is adapted to receive a contact therein at a contact receiving position. The second passage 154 establishes fluid communication between the housing cavity 150 and an air pressure hose which is secured at the top surface 144 of the housing 142 at one end thereof by a fitting 158 and which is connected at its opposite end to a regulated air pressure source (not shown) but similar to the air pressure source 30 of the first embodiment which is able to supply the required air pressure.

The lower arm member 148 includes a third passage 159 which extends therethrough from the housing cavity 150 to the lower surface 161 of the housing 142 and which is aligned with the second passage 154 formed through the upper arm member 146.

A generally rectangular slide member 160 which is fixedly mounted to a cylindrical rod 162 is slidably mounted within the housing cavity 150 and is held therein by a vertical face plate 164 of the housing 142. The rod 162 and the mounted slide member 160 form the reciprocating members of an air cylinder generally indicated at 166 which is mounted to a vertical support member 168 of the support structure 114 by bolts 170 (only one of which is shown). The air cylinder 166 is controlled to extend and retract the rod 162 within the housing 142 in a conventional fashion by means of air flowing in air pressure hoses 172 and 174 of the air cylinder 166.

As best shown in FIG. 5a, a contact receiving aperture 176 extends through the mounted slide member 160 and the rod 162 between the upper and lower arm members 146 and 148, respectively, at a position spaced along the rod 162 such that the contact receiving aperture 176 is aligned and communicates with the first passage 152 when the rod 162 is totally retracted, and is also aligned and communicates with the second and third passages 154 and 159, respectively, when the rod 162 is in its fully extended position.

Also mounted on the rod 162 of the air cylinder 166 are a pair of plate-shaped stops 178 and 179 spaced apart on the free end 180 of the rod 162. A vertical stopping member 182 is alternately engaged by each of the stops 178 and 179 in the extended and retracted positions of the rod 162 to limit the movement of the rod 162 and insure that the contact receiving aperture 176 is correctly aligned with the first passage 152 and, subsequently, with the second and third passages 154 and 159.

Also fixedly mounted on the rod 162 at its opposite end is a disc 184 which is adapted to engage and disengage first and second micro-switches 186 and 188, respectively, which in turn provides control signals indicating retraction and extension of the rod 162, respectively.

Figure 7:
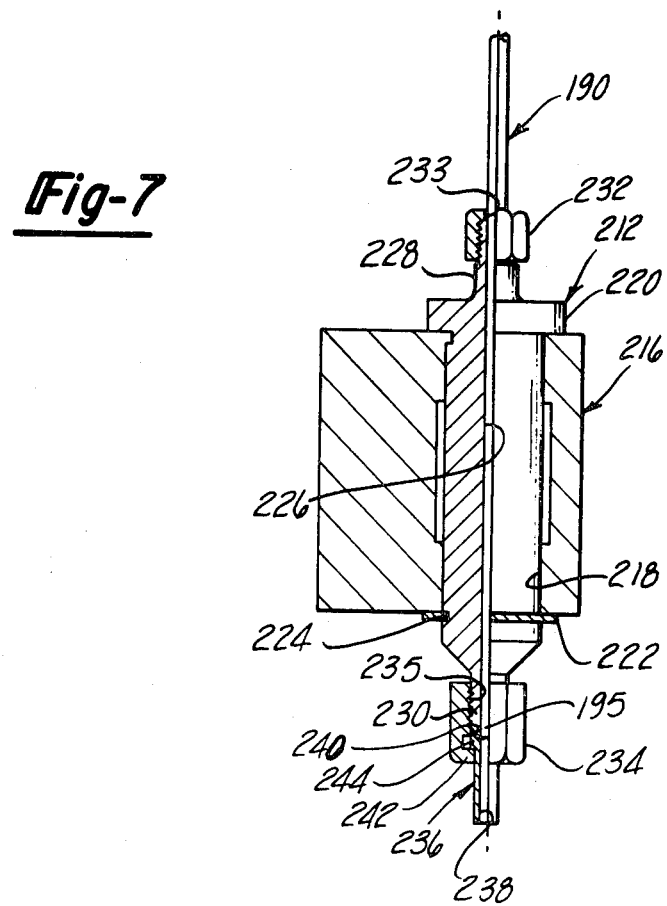
FIG. 7 is a sectional view, partially broken away, and in cross-section of the second embodiment of the present invention.

The apparatus 110 also includes a single piece of clear, flexible, plastic tubing which preferably comprises shrink polyolefin generally indicated at 190. Referring to FIGS. 6 and 7, the tubing 190 has a tubing passage 192 extending completely therethrough between first and second ends 193 and 195 of the tubing 190. The first end of the tubing 190 is supported in alignment with and in fluid communication with the third passage 159 in the lower arm member 148 adjacent the lower surface 161 of the housing 142 by an elongated part r fitment generally indicated at 194 which is threaded at its outer surfaces at opposite end portions 196 and 198. The one end portion 196 is threadedly received within a lower threaded portion of the third passage 159. The fitment 194 includes an axial fitment hole 200 which includes a first hole portion 202 having a first diameter at the one end portion 196 and which has a second hole portion 204 at the opposite end portion 198 adapted for receiving the first end 193 of the tubing 190. The diameter of the first hole portion 202 is substantially equal to the inner diameter of the plastic tubing 190 while the diameter of the second hole portion 204 is substantially equal to the outer diameter of the plastic tubing 190. For example, the inner diameter of the plastic tubing 190 preferably equals approximately 0.076 inches while the outer diameter of the plastic tubing 190 equals approximately 0.125 inches.

The first end 192 of the plastic tubing 190 is secured within the second hole portion 204 and against a tapered shoulder portion 206 of the fitment 194 by a threaded nut 208 which has a central aperture 210 extending completely therethrough defined by a threaded inner wall of the nut 208.

The plastic tubing 190 is secured at its second end 195 by an elongated tube holder generally indicated at 212 in FIG. 7. As shown in FIG. 5, the tube holder 212 is fixedly mounted to a second vertical support member 214 by a mounting support 216. The mounting support 216 may be secured to the second vertical support member 214 by mounting bolts or by welding.

As shown in FIG. 7, the tube holder 212 is held within a central passage 218 formed through the mounting support 216 between a collar portion 220 of the tube holder 212 and a locking C-ring 222 disposed in an annular groove 224 formed in the outer surface of the tube holder 212. The plastic tubing 190 extends through an axial passage 226 formed through the tube holder 212. The diameter of the axial passage 226 is substantially equal to the outer diameter of the plastic tubing 190.

At opposite ends of the tube holder 212 there are formed first and second integral sleeves 228 and 230, respectively. The axial passage 226 extends completely therethrough each of the first and second sleeves 228 and 230 and are threaded at their outer surfaces to receive corresponding locking nuts 232 and 234, respectively, which are likewise threaded and have central apertures 233 and 235, respectively, formed therethrough, to receive and secure the tubing 190 within the sleeves 228 and 230.

A terminal part comprising a metal air tip generally indicated at 236 has a bore 238 extending completely therethrough and which is removably held adjacent an unloading position as shown in FIG. 5 by a radially extending collar portion 242 of the locking nut 234 at a shoulder portion 244 of the air tip 236. The shoulder portion 244 is tapered at its end surface 240 to place the bore 238 in fluid communication and in alignment with the passage 192 at the second end 195 of the tubing 190.

Referring again to FIG. 5 the apparatus 110 includes an X-Y table generally indicated at 246 which preferably comprises a Rapid Position Table Model 2000 sold by Assembly Engineers, Inc. of Los Angeles, Calif. The X-Y table 246 includes a first base member 248, a second base member 250, and a third base member 252. The third base member 252 is fixedly secured to a horizontal frame member 254 of the support structure 114. Both the first and second base members 248 and 250, respectively, are supported on the third base member 252 to move in a direction indicated by arrow 259 on bearings contained within races (not shown) between the second and third base members 250 and 252, respectively. The first base member 248 is supported on the second base member 250 to move in a direction indicated by arrow 256 also on bearings contained within races (not shown) disposed between the first base member 248 and the second base member 250.

A rectangular locating jig generally indicated at 258 is fixedly mounted at the top surface 260 of the first base member 248 such as by bolts 262 (only two of which are shown). The locating jig 258 includes a pair of upwardly projecting locating pins 264 and 266 adapted to be received within a pair of locating holes 268 and 270, respectively, formed through the ends of the connector 31. The locating pin 266 is slidably adjustable within an elongated slot 272 formed through the top surface of the locating jig 258 to allow the locating jig 258 to accommodate connectors of various lengths or, in other words, connectors which have varying numbers of cavities formed therein. The connector 31 is press-fit over the locating pins 264 and 266 at the locating holes 268 and 270, respectively, to thereby securely hold the connector 31 on the locating jig 258.

Also mounted on the top surface 260 of the first base member 248 is a removable locating plate 274 removably mounted thereon by bolts 276. The locating plate 274 has a plurality of arranged apertures 278 formed therein at its top surface corresponding to the configuration and number of cavities formed in the connector 31. Each of the apertures 278 is adapted to receive a conical point 280 which extends radially from a lever arm 281 pivotally mounted between a pair of supporting arm members 282 by a pivot rod 284. The opposite end of the lever arm 281 is connected to a piston rod 286 of a second air cylinder generally indicated at 288 to move therewith. When the piston rod 286 is extended by the second air cylinder 288, the lever arm 281 pivots about the pivot rod 284 so that the conical point 280 extends into one of the apertures 278 to thereby hold the locating plate 274 and, thereby, the first base member 248 in position.

The apertures 278 of the locating plate 274 are configured in the same array as the cavities 62 are configured at the top surface of the connector 31. As can be readily appreciated if a connector of a different size or having cavities of a different configuration is mounted on the locating jig 258, a locating plate having apertures of corresponding configuration is used in place of the locating plate 274.

When the piston rod 286 is retracted the lever arm 281 pivots about the pivot rod 284 so that the conical point 280 is moved upwardly thereby releasing the locating plate 274. A third micro-switch 290 is actuated by the lever arm 281 adjacent the piston rod 286 to produce a signal indicating when the piston rod 286 is retracted and extended.

The first base member 248 also has fixedly secured thereto a handle mechanism generally indicated at 292 including an I-shaped block 294 extending radially from one edge surface of the first base member 248. The handle mechanism 292 also includes a handle 296 secured to the block 294 and adapted to be gripped by the operator of the apparatus 110 to move the first base member 248 in the direction indicated by the arrows 259 and 256.

The third base member 252 has a visual guide plate 298 removably mounted thereto by bolts 300. The guide plate 298 has formed thereon spaced indicia 302 which represent the various cavities 62 formed in the connector 31. A pointer 304, which is fixedly mounted to the block 294 and extends therefrom, indicates or points out which one of the cavities 62 is positioned immediately below the air tip 238 at the unloading position. The visual guide plate 298 is preferably formed of a magnetic substance so that a flexible magnetic gauge comprising an L-shaped plate member 306 may be placed or positioned over certain ones of the indicia 302 so that the operator of the apparatus 310 can more easily ascertain which one of the spaced indicia 302, the pointer 304 is pointing to.

A push button 308 is provided on the block 294 so that the operator can push the push button 308 while at the same time holding onto the handle 296. The button 308 initiates the automatic insertion of contacts such as the contact 14 as shown in FIG. 3 into connectors such as the connector 31 to be received and held therein.

Initially, a first contact which exits from the vibrating bowl 112 is positioned above the transfer tube 136 by the air cylinder 124 and pulled therethrough and through the venturi tube 138 into the first passage 152 and then into the aligned contact receiving aperture 176 at a contact receiving position 153 wherein the rod 162 is fully retracted, the stop 178 engaging the stopping member 182. The operator of the apparatus 110 positions the connector 31 on the locating jig 258 and moves the first base member 248 so that a first cavity formed in the connector 31 is aligned with the air tip 236 at the contact unloading position as indicated by the pointer 304. At that time, the operator pushes the push button 308 to actuate the second air cylinder 288 to cause the rod 286 to extend and the conical point 280 to extend into one of the apertures 276 representing the first cavity thereby holding the first base member 248 in position. At this time the X-Y table 246 and the connector 31 are locked in alignment for contact insertion.

When the rod 286 is fully extended the lever arm 281 engages the third micro-switch 290 which, in turn, activates the air cylinder 166 by a solenoid air valve. The rod 162 of the air cylinder 166 extends until the disc 184 contacts or engages the second micro-switch 188 which activates the air pressure source similar to air pressure source 30 by a solenoid air valve to provide a forward air pressure force of approximately 40 psig in the air pressure hose 156 and into the second passage 154 formed in the upper arm member 146. When the slide member 160 is fully extended the contact receiving aperture 176 is aligned with the second passage 154 and the third passage 159 so that the first contact is propelled through the third passage 159, through the fitment hole 200, through the tube passage 192, through the air tip bore 238 and into the aligned cavity. When the rod 162 is in its fully extended position the second stop 179 engages the stopping member 182. As previously mentioned the contact is retained therein the cavity by the particular contact retention mechanism formed therein.

When the operator realizes that the contact has been inserted the operator releases the push button 308 which allows the second air cylinder 288 to retract the rod 286 to pivot the lever arm 281 about the pivot rod 284 thereby allowing the conical point 280 to release the first base member 248 at the locating plate 274. At the same time, the third micro-switch 290 causes the air cylinder 166 through its solenoid air valve to retract the rod 162 and the disc 184 activates the first micro-switch 186 which, in turn, causes the air cylinder 124 through its solenoid air valve to move a second contact over the tube 136 to be pulled therethrough and through the venturi tube 138, through the first passage 152 and into the contact receiving aperture 176. The operator again moves the X-Y table 246 by means of the handle 296 such that the pointer 304 indicates that another cavity of the cavity 62 is aligned at the unloading position and may receive a contact therein and the operator may again press the push button 308 to begin the cycle again.

While two embodiments including a preferred embodiment of the invention have been shown and described herein in detail, those skilled in this art will recognize various alternative designs and embodiments of the present invention as defined in the following claims.

What is claimed is:

1. An apparatus for automatically inserting an electrical contact of the type having a retention portion into an electrical connector adapted to retain the contact in a cavity of the connector by a contact retention mechanism, including guide means (52) extending from a contact loading position to a contact unloading position adjacent the connector for guiding the contact in a forward direction from the loading position to the cavity of the connector, and wherein the improvement comprises:
    said guide means includes a slide rod (162) having a contact receiving passage (176) and mounted for axial reciprocation between the contact loading position and contact unloading positions, and
    propelling means (30) operatively associated with said guide means for controllably propelling the contact, said guide means guiding the propelled contact into the cavity.

2. An apparatus for automatically inserting at least two electrical contacts of the type having a retention portion into an electrical connector adapted to retain the contacts in corresponding spaced cavities formed in the connector, said apparatus comprising:
    guide means for guiding the contacts from a loading position to their respective unloading position and into their respective cavities of the connector,
    said guide means including a slide rod (162) having a contact receiving passage (176) therethrough mounted for reciprocation between the contact loading position and the contact unloading position, said contact receiving passage receiving a contact when registered with the loading position and communicating a contact when registered with the unloading position,
    propelling means operatively associated with said guide means for controllably propelling the contacts, said guide means guiding the propelled contacts into their respective cavities, and
    indexing means for moving the connector relative to the guide means so that the cavities of the connector are successively aligned with said guide means so that the contacts are propelled into their corresponding cavities.

3. The apparatus as defined in claim 2 wherein said propelling means comprises a regulated air pressure source for producing a propelling air pressure force.

4. The apparatus as defined in claim 2 wherein said indexing means includes a movable base member for supporting the connector to move therewith.

5. An apparatus for automatically inserting an electrical contact of the type having a retention portion into an electrical connector adapted to retain the contact in a cavity of the connector by a contact retention mechanism, said apparatus comprising:
    guide means extending from a contact loading position to a contact unloading position adjacent the connector for guiding the contact in a forward direction from the loading position to the cavity of the connector,
    said guide means including a housing (142) of the type having a first passage (152) representing the contact loading position extending therein, a second passage (152, 159) representing the contact unloading position extending therethrough in spaced relation from the first passage and a slide rod (162) having a third passage (176), said rod being mounted for transverse reciprocating registering movement between said first and second passages to communicate the contact between the passages when registered therewith, and
    propelling means operatively associated with said guide means for controllably propelling the contact, said guide means guiding the propelled contact into the cavity.

6. The apparatus as defined in claim 5 wherein said propelling means comprises a regulated air pressure source for producing a forward propelling air pressure force.

7. The apparatus as defined in claim 6 including a base member having a support surface for supporting the connector thereon.

8. The apparatus as defined in claim 7 wherein said apparatus includes generating means operatively associated with said base member for controllably producing an air pressure force in the cavity to seat the retention portion of the contact within the contact retention mechanism.

9. The appartus as defined in claim 8 wherein said generating means includes a second regulated air pressure source for producing a reverse propelling air pressure force.

10. The apparatus as defined in claim 9 wherein said generting means includes a seating tool having a hole extending therethrough and aligned with the cavity of the connector for placing the cavity in fluid communication with the second air pressure source.

11. The apparatus as defined in claim 5 or claim 6 including an alignment tool having an aperture extending therethrough aligned with the second passage and the cavity of said connector at said unloading position, said alignment tool being adapted to reduce the amount of air flowing in a reversed direction from the cavity and into the passage of the tubing at the unloading position.

12. The apparatus as defined in claim 9 including a movable stop operatively associated with the tubing for blocking air flowing in a reverse direction within the passage of said tubing at said loading position.

13. The apparatus as defined in claim 5 including positioning means for positioning the contact at the loading position so that the contact is oriented in a predetermined direction.

14. The apparatus as defined in claim 13 wherein said positioning means includes orienting means adapted to receive the contact for orienting the received contact.

15. The apparatus as defined in claim 14 wherein said orienting means includes a vibrating unit for orienting the contact by vibrational energy.

16. The apparatus as defined in claim 14 including inspecting means operatively associated with said positioning means for inspecting an oriented contact for defects.

* * * * *